(12) United States Patent
Rebella et al.

(10) Patent No.: US 10,116,492 B2
(45) Date of Patent: Oct. 30, 2018

(54) METHOD AND NETWORK NODE FOR MANAGING RESOURCE ALLOCATION IN TRAFFIC RESTORATION

(71) Applicant: Telefonaktiebolaget LM Ericsson (publ), Stockholm (SE)

(72) Inventors: Paolo Rebella, Genoa (IT); Diego Caviglia, Genoa (IT); Daniele Ceccarelli, Genoa (IT); Francesco Fondelli, Genoa (IT)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 153 days.

(21) Appl. No.: 15/106,299

(22) PCT Filed: Dec. 20, 2013

(86) PCT No.: PCT/EP2013/077711
§ 371 (c)(1),
(2) Date: Jun. 19, 2016

(87) PCT Pub. No.: WO2015/090449
PCT Pub. Date: Jun. 25, 2015

(65) Prior Publication Data
US 2016/0337168 A1 Nov. 17, 2016

(51) Int. Cl.
*H04L 12/24* (2006.01)
*H04L 12/707* (2013.01)
(Continued)

(52) U.S. Cl.
CPC .......... *H04L 41/0654* (2013.01); *H04L 45/22* (2013.01); *H04L 45/28* (2013.01);
(Continued)

(58) Field of Classification Search
CPC ...... H04L 41/0654; H04L 45/22; H04L 45/28
See application file for complete search history.

(56) References Cited

U.S. PATENT DOCUMENTS

| | | | | |
|---|---|---|---|---|
| 7,352,692 B1 * | 4/2008 | Saleh | ................. | H04J 14/0284 370/216 |
| 2003/0137932 A1 * | 7/2003 | Nishioka | ............ | H04L 41/0668 370/216 |
| 2009/0034975 A1 * | 2/2009 | Sadananda | .......... | H04J 14/0295 398/79 |

FOREIGN PATENT DOCUMENTS

EP 1705831 A1 * 9/2006 ......... H04L 43/0817

OTHER PUBLICATIONS

PCT International Search Report, dated Oct. 7, 2014, in connection with International Application No. PCT/EP2013/077711, all pages.
(Continued)

*Primary Examiner* — Siming Liu
(74) *Attorney, Agent, or Firm* — Leffler Intellectual Property Law, PLLC

(57) ABSTRACT

A method and a network node for managing allocation of network resources in restoration of traffic in a connection oriented network are disclosed. The method comprises restoring a first traffic from a first path on an alternative path if the first path is affected by a first failure and assigning a reserved status to resources of the first path no longer used for carrying the first traffic. If a second path is affected by a second failure the method comprises restoring a second traffic from the second path, wherein the restoration of the second traffic does not use the resources having the reserved status.

20 Claims, 13 Drawing Sheets

(51) Int. Cl.
*H04L 12/703* (2013.01)
*H04L 12/911* (2013.01)
*H04L 12/917* (2013.01)
*H04L 12/851* (2013.01)

(52) U.S. Cl.
CPC ............ *H04L 47/24* (2013.01); *H04L 47/728* (2013.01); *H04L 47/76* (2013.01)

(56) References Cited

OTHER PUBLICATIONS

PCT Written Opinion, dated Oct. 7, 2014, in connection with International Application No. PCT/EP2013/077711, all pages.
European Communication dated Apr. 11, 2018 in connection with European Application No. 13814941.4, 5 pages.

\* cited by examiner

* Optional

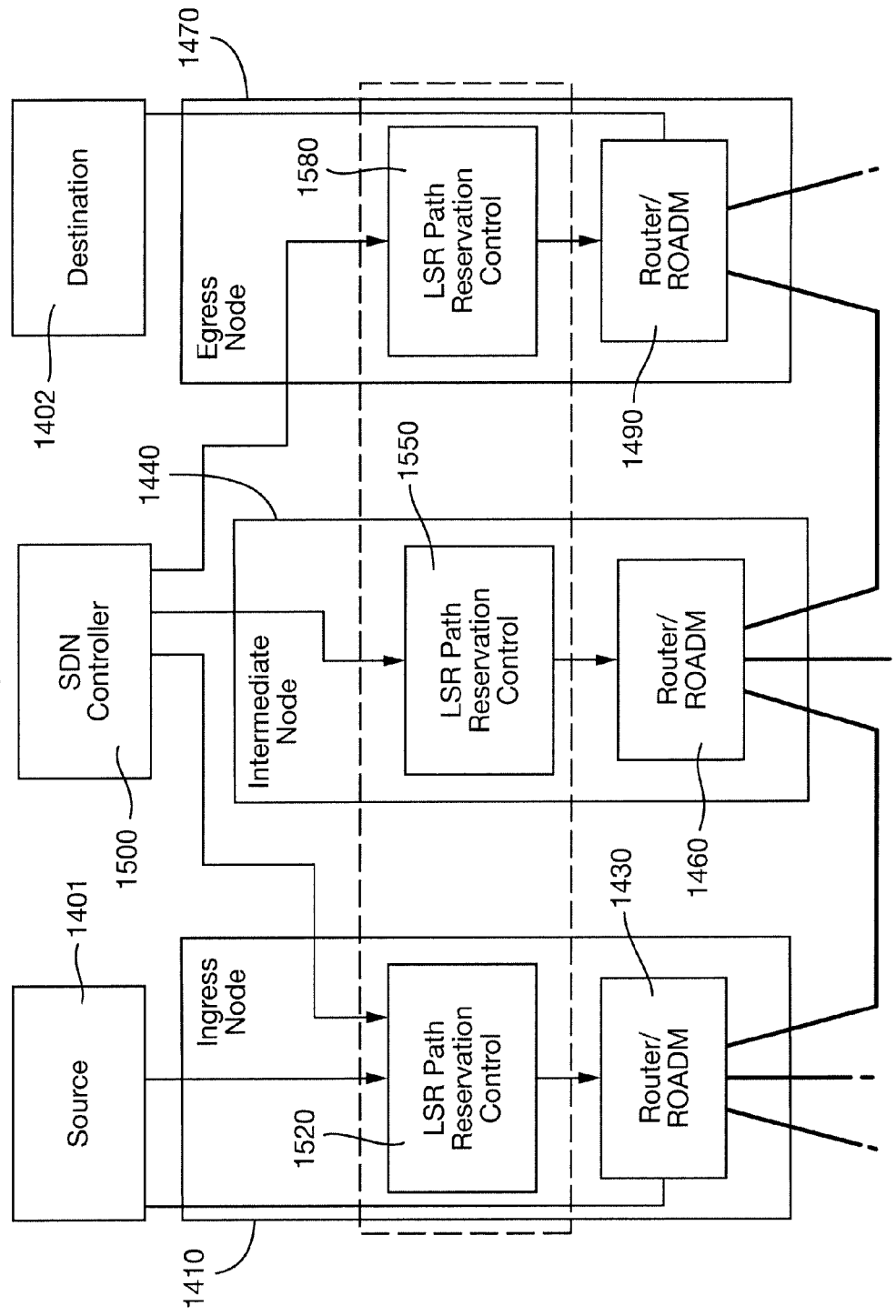

METHOD AND NETWORK NODE FOR MANAGING RESOURCE ALLOCATION IN TRAFFIC RESTORATION

TECHNICAL FIELD

The present invention relates to connection oriented networks, in general, and in particular to traffic restoration in connection oriented networks.

BACKGROUND

In control plane managed networks (both distributed e.g. GMPLS and centralized e.g. SDN) it is not possible to ensure return to the original (nominal) path of traffic restored on a restoration path in response to a failure affecting the nominal path after the failure is repaired.

Existing control plane technology is based on two recovery mechanisms: protection and restoration. In the case of protection two paths are always provided, called working and protection paths. The two paths are always committed (i.e. resources dedicated to a given circuit and hence traffic flow) and depending on failures traffic is moved from worker to protection and vice-versa. In the case of restoration, a single path at time is dedicated to a given circuit. When a failure occurs a new path is computed and all the traffic is moved to the restoration path.

When a network is planned, the nominal path between two nodes is computed and provided. This nominal path is computed in a way taking into consideration requirements of the traffic and what the network has to offer. From this point of view the nominal path is an optimal path for the traffic.

A communications network is often large and complex structure and failures affecting traffic in the network happen from time to time. These could be software or hardware failures in network nodes or physical failures affecting links between nodes. For example an optical fibre link may be cut during ground works. It may also happen that a number of failures occur in a short period of time. Because the network operator has contracts for delivering data maintaining connections between nodes is essential for sustainability of the business. In consequence a network fault triggers protection and/or restoration. However, in the case of restoration, after a number of failures topology of the network is changed and the paths linking nodes no longer use the same resources. In consequence when a fault is repaired the traffic that has been restored on a restoration path cannot be returned to the nominal path because the resources of the nominal path have been used for traffic restoration of other paths affected by other faults. This situation is shown in FIG. 13. When a number of network faults occurred the network might fall in a condition when moving the circuits back to their optimal paths is not possible or would require extremely difficult and traffic affecting operations.

In consequence network faults (especially multiple faults) make it impossible to return to nominal path(s), which, in turn, leads to operating the network based on sub-optimal routing.

SUMMARY

It is the object of the present invention to obviate at least some of the above disadvantages and provide an improved method and network node for managing allocation of network resources in traffic restoration in a connection oriented network.

Accordingly, the invention seeks to preferably mitigate, alleviate or eliminate one or more of the disadvantages mentioned above singly or in any combination.

According to a first aspect of the present invention there is provided a method of managing allocation of network resources in restoration of traffic in a connection oriented network. The method comprises restoring a first traffic from a first path on an alternative path if the first path is affected by a first failure and assigning a reserved status to resources of the first path that are no longer used for carrying the first traffic. The method further comprises restoring a second traffic from a second path if the second path is affected by a second failure, wherein the restoration of the second traffic does not use the resources having the reserved status.

Preferably the method comprises assigning to the resources having the reserved status a priority which is equal to priority of the first traffic.

According to a second aspect of the present invention there is provided a node for a connection oriented network. The node comprises a processor and a memory, said memory contains instructions executable by said processor. Said node is operative to restore a first traffic from a first path on an alternative path if the first path is affected by a first failure and to assign a reserved status to resources of the first path no longer used for carrying the first traffic. Said node is also operative to restore a second traffic from a second path if the second path is affected by a second failure, wherein in the restoration of the second traffic the resources having the reserved status are not used.

Preferably the node is further operative to assign to the resources having the reserved status a priority which is equal to priority of the first traffic.

According to a third aspect of the present invention there is provided a node for a connection oriented network. The node is configured to manage allocation of network resources in restoration of traffic and the node comprises a restoration module configured to restore a first traffic from a first path on an alternative path if the first path is affected by a first failure. The node also comprises an assigning module which is configured to assign a reserved status to resources of the first path no longer used for carrying the first traffic. The restoration module is configured to restore a second traffic from a second path if the second path is affected by a second failure, and in the restoration of the second traffic the restoration module is configured not to use the resources having the reserved status.

Preferably the assigning module is configured to assign to the resources having the reserved status a priority which is equal to priority of the first traffic.

According to a fourth aspect of the present invention there is provided a connection oriented network comprising a node as defined above.

Further features of the present invention are as claimed in the dependent claims.

As a result of implementing the invention in accordance with one of its embodiments allocation and usage of network resources is optimised in a network affected by a fault or even multiple faults. Additionally, the invention is applicable to any type of control plane (centralized or distributed) and allows meeting the customers requirement of having the network moved back to nominal paths after a failure is repaired, even if in the meantime additional faults developed in the network.

Implementation of the present invention is particularly beneficial in those types of networks where pre-emption of Label Switched Paths carrying traffic is to be avoided due to the technology specific restoration time (tens of seconds).

The most important example of such networks is Wavelength Division Multiplex, WDM, network.

A further advantage of the present invention is that the addition of the priority value, which in effect is a pre-emption priority applicable only to reserved resources, allows for maintaining the level of resiliency of the network and keeping the restoration degree unchanged, where the restoration degree is the amount of alternate paths available for restoration. In other words the method does not decrease the number of alternate paths for restoration.

BRIEF DESCRIPTION OF THE DRAWINGS

The present invention will be understood and appreciated more fully from the following detailed description taken in conjunction with the drawings in which:

FIGS. 14 and 15 show diagrams illustrating a connection oriented network in embodiments of the present invention.

DETAILED DESCRIPTION

Figure 1:
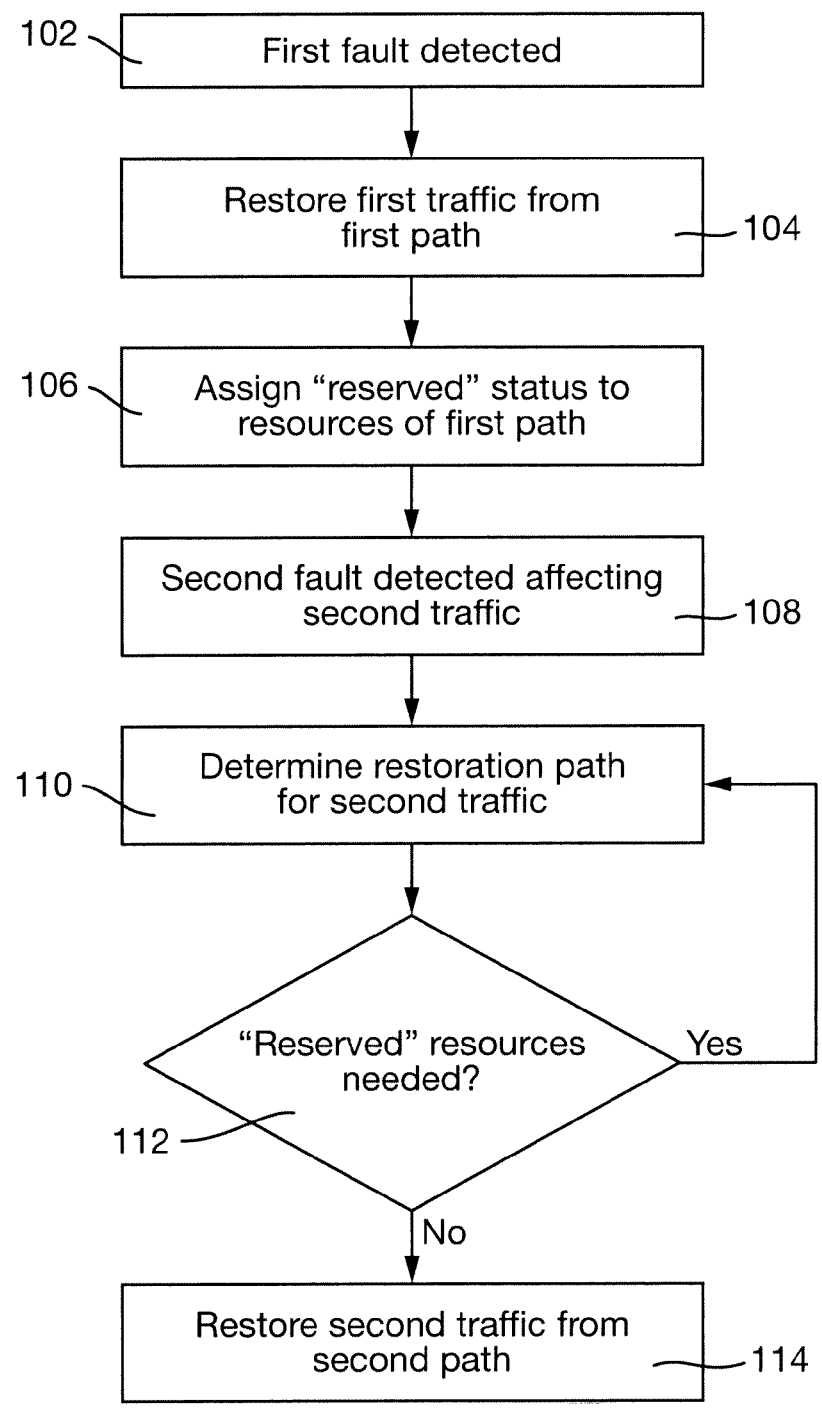
FIG. 1 is a flow-chart illustrating a method of managing allocation of network resources in traffic restoration in one embodiment of the present invention.

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary details.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

When a network is planned, the nominal path between two nodes is computed and provided. This nominal path is computed in a way taking into consideration requirements of the traffic and what the network has to offer. From this point of view the nominal path is an optimal path for the traffic. When a failure occurs and the traffic is restored along a restoration path it would be good to keep track of the nominal path to be able to revert the traffic back to the nominal path once its resources are healed. In the solutions known in the art the resources released as a result of a fault affecting the nominal path are no longer used and are free to take if necessary, both in the case of networks with distributed and centralised control planes.

The inventors have recognised that there are two main problems that affect efficiency of a network undergoing restoration following a fault. The first problem is the lack of capability of reserving the nominal path in the case of restoration. This makes it difficult or even impossible for the restored traffic to return to its nominal path after the fault has been repaired. The second problem only manifests itself once reservation of resources is implemented and is especially visible when multiple faults occur, the problem is the lack of capability of managing pre-emption of resources with reserved paths. The second problem means that reserving nominal paths might reduce the resiliency of the network (i.e. higher priority circuits might not find available resources for restoration).

Since a single path at time is dedicated to restorable LSP (Label Switched Path), when a failure occurs a new path is computed and all the traffic is moved to the new path. The basic idea is to keep the resources of the failed nominal path reserved and, preferably, with a priority associated so that, when the failure is recovered, it is possible to automatically or manually reroute the LSP back on the nominal path (which is the optimal one).

Figure 4:
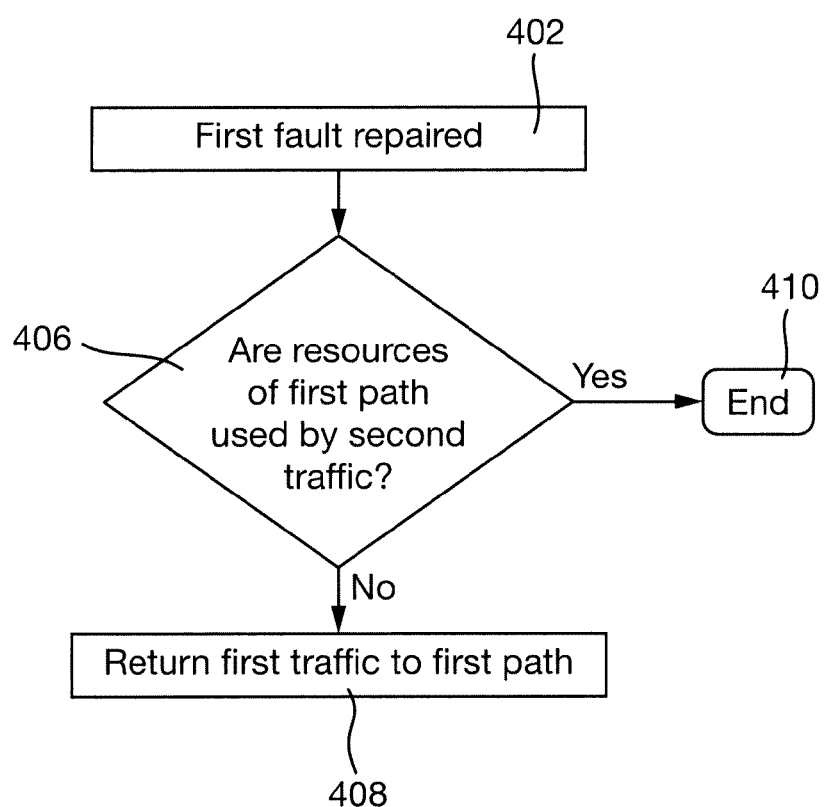
FIG. 4 is a flow-chart illustrating operations after repair of a fault in embodiments of the present invention.
Figure 7A:
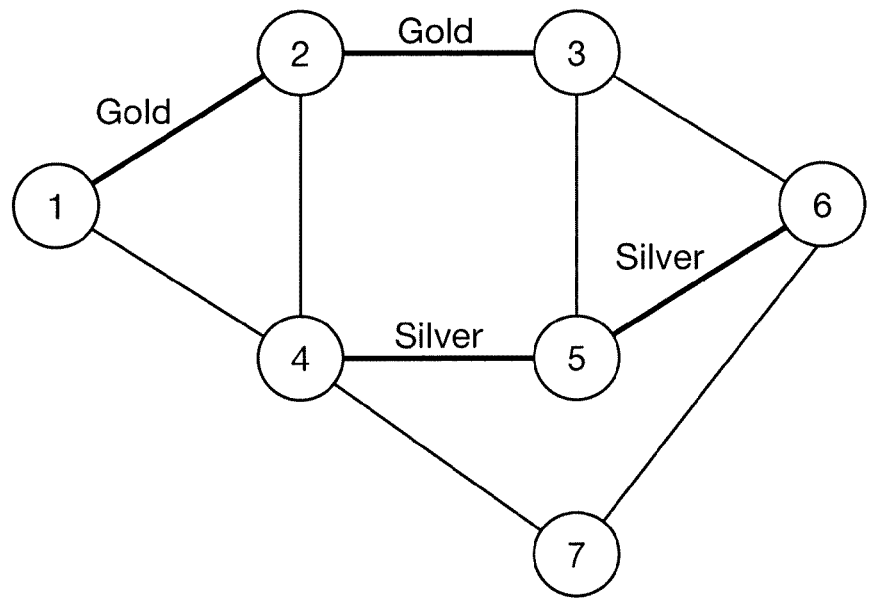
FIG. 7A-7D are diagrams illustrating operation of a connection oriented network in one embodiment of the present invention.
Figure 7B:
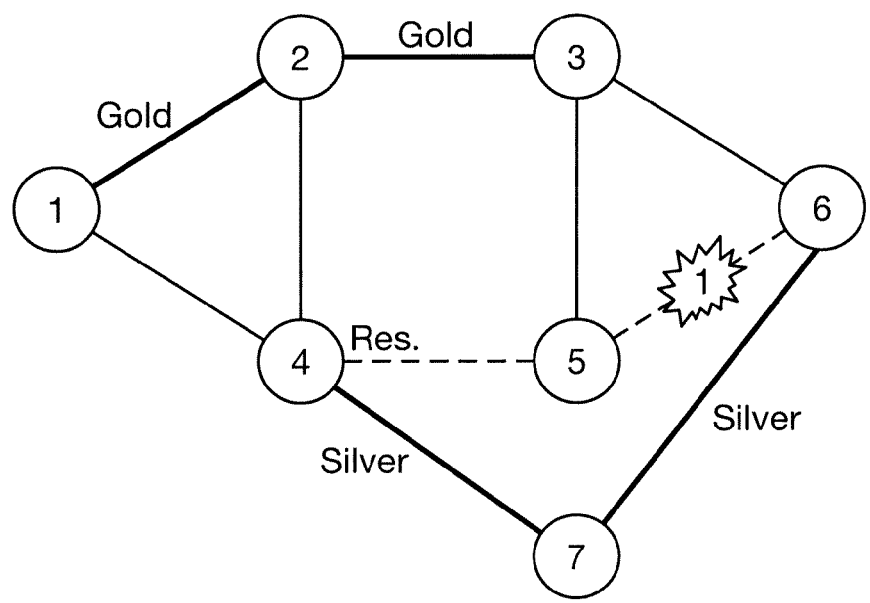
Figure 7C:
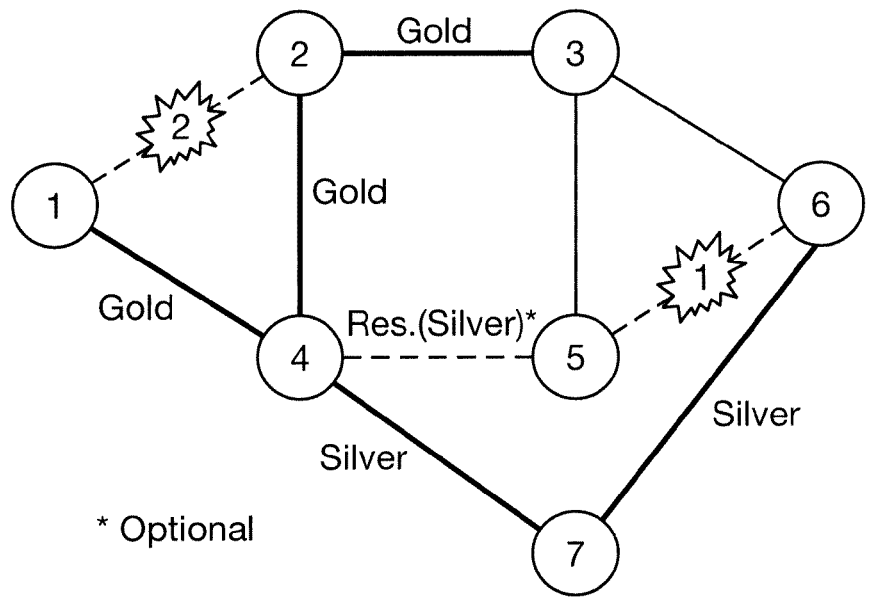

With reference to FIG. 1 and FIG. 7A-7D an embodiment of a method of managing allocation of network resources in restoration of traffic in a connection oriented network is presented. The network comprises seven nodes 1-7 and links connecting the nodes. Two paths carrying traffic are illustrated. A first traffic is denoted as Silver and this may also refer to priority of the traffic. A second traffic is denoted as Gold and this may also refer to priority of the traffic. Priority Gold is higher than Silver. However, in the broadest embodiment of the invention priority is not relevant. As shown in FIG. 7A the first traffic flows between node 4 and node 6 via node 5 and the second traffic flows between nodes 1 and 3 via node 2. The method comprises restoring 104 a first traffic from a first path (Silver traffic) if the first path is affected by a first failure 102 (failure 1 between nodes 5 and 6 in FIG. 7B). The first traffic is restored on an alternative path, which in the embodiment illustrated in FIG. 7B means that the silver traffic now flows between nodes 4 and 6 via node 7. As a result of the restoration of the silver traffic the link between nodes 4 and 5 is no longer used. To avoid the link being taken over by other traffic the method comprises assigning 106 a reserved status to resources of the first path no longer used for carrying the first traffic. This is illustrated in FIG. 7B by the status "Res" (i.e. reserved) above the link 4-5. If a second fault is detected in the network, 108, and it affects the second traffic (i.e. Gold), as illustrated in FIG. 7C, the method comprises restoring 114 the second traffic from the second path (i.e. 1-2-3). The restoration of the second traffic does not use the resources having the reserved status. As shown in FIG. 1 the loop 110-112 ensures that reserved resources are avoided. FIG. 7C shows restoration of the second traffic using resources other than the resources having the reserved status: the second traffic uses path 1-4-2-3. In this way, as illustrated in FIG. 4, the reserved link 4-5 is not used, 406, for restoration and is ready for the first traffic to return 408 when the first fault is repaired 402.

Depending on location of the fault and topology of the network some of the resources used by the first traffic may still be used by the first traffic after restoration and therefore their status does not change to reserved.

Figure 2:
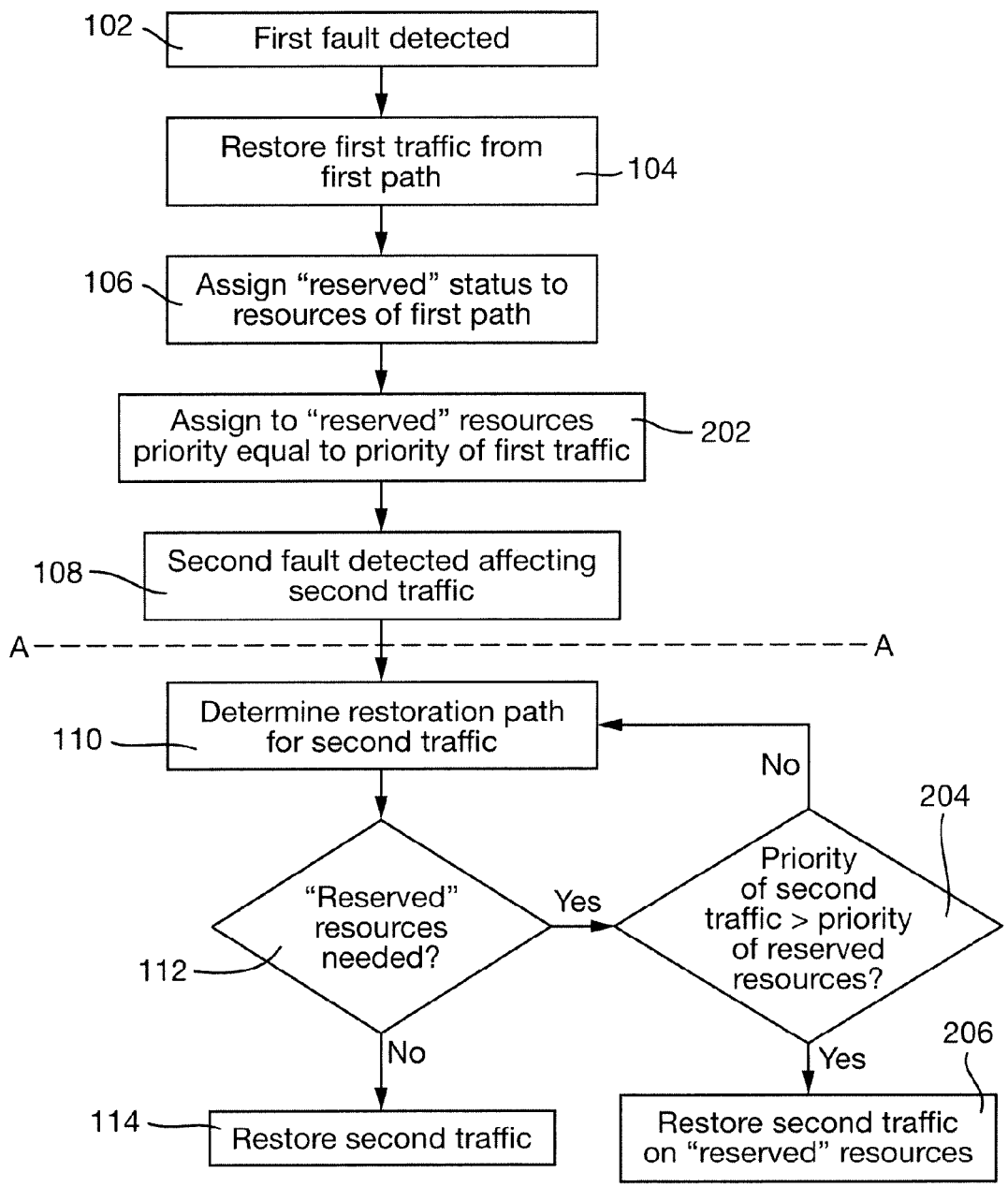
FIG. 2 is a flow-chart illustrating a method of managing allocation of network resources in traffic restoration in one embodiment of the present invention.

In a preferred embodiment, illustrated in FIG. 2, the method comprises assigning 202 to the resources having the reserved status a priority which is equal to priority of the first traffic. We call this priority assigned to reserved resources a Reservation Pre-emption Priority (RPP). This is illustrated in FIG. 2 and in FIG. 7C, where the released link 4-5 in addition to status reserved (Res) has also a RPP of a value inherited from the first traffic (i.e. Silver).

In one embodiment of the present invention the RPP is assigned to resources at the time when a nominal path for carrying traffic is calculated and implemented. In this embodiment the RPP plays no role until a fault occurs that affects the nominal path. In an alternative embodiment the RPP is created and assigned to resources when the traffic is restored following a failure affecting the nominal path. In a simplest embodiment the RPP is created by copying the value of the traffic being restored.

It must be understood that although the priority of network traffic known in the art and the Reservation Pre-emption Priority introduced in this document may have the same value they are in fact two independent values. The priority known in the art refers to an actual traffic carried over a path in a network whereas a network resource that is characterised by the RPP does not carry the traffic on which the RPP value is based.

Figure 7D:
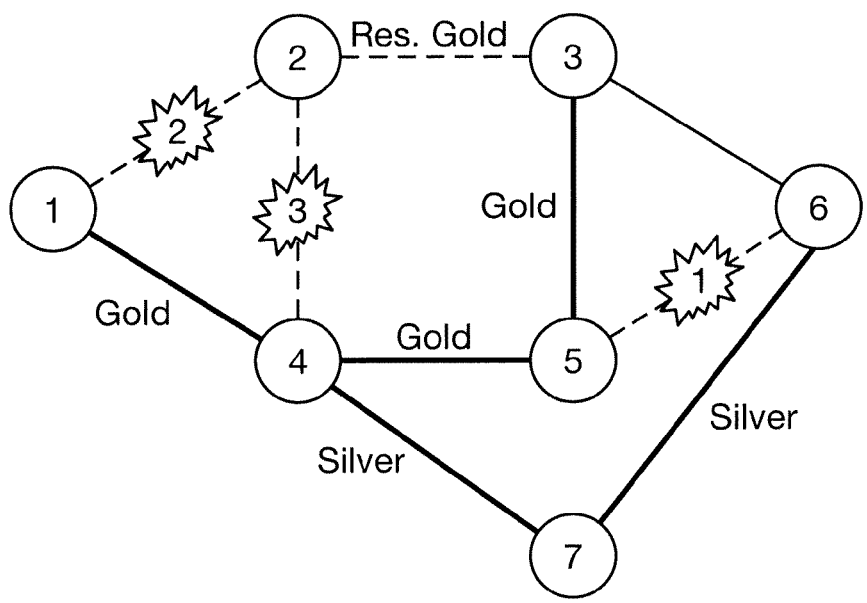

In this way a conditional reservation is introduced because if there is no other path to restore the second traffic than one that goes via reserved resources or if a third (or further) fault develops (as illustrated in FIG. 7D) then it is allowed to restore 206 the second traffic on the reserved resources if priority of the second traffic is higher than priority assigned to the reserved resources 204. In the embodiment shown in FIG. 7D the second traffic has priority Gold, which is above the Silver priority of the reserved link 4-5 and the reserved link is taken over for restoration of the second traffic.

The mentioned earlier lack of capability of managing pre-emption of resources with reserved paths may lead to reduction of resiliency of the network (i.e. higher priority circuits might not find available resources for restoration). However, the management of reservation pre-emption priorities mitigates such issues by letting higher priority circuits "steal" the resources reserved for nominal paths. This means that if the nominal path is reserved for a path with low priority (lower than the one that wants to "steal" the reserved resources), it is possible to pre-empt such resources (or to be more precise to pre-empt the reservation status) only for restoration of circuits with higher priority.

When restoring other Label Switched Paths in the network, the computation avoids using the resources reserved for any nominal path. Only in case of lack of free resources, in order not to decrease the resiliency degree of the network, it is allowed to pre-empt reserved resources on a priority basis (priority of the traffic to be restored must be higher than priority assigned to the reserved resources).

To better understand the present invention let's assume that FIG. 7A-7D illustrate a WDM network carrying MPLS traffic. As shown in FIG. 7A two LSPs are in place, one carrying gold services (i.e. high RPP, e.g. 0 or 1) and one carrying silver services (i.e. low RPP, e.g. 5 or 6).

In case a failure occurs and the resources of the nominal path of the silver LSP are impacted, the silver LSP is restored on path 4-7-6, but the resources of its nominal path are kept reserved (i.e. link 4-5) as illustrated in FIG. 7B.

If a second failure occurs and the nominal path of the gold service is impacted (e.g. link 1-2), the gold LSP is restored avoiding the reserved resource (i.e. link 4-5 is not used for this restoration). In this way it is possible for the silver LSP to be moved back to its nominal path without impacting the gold LSP.

Thanks to implementation of the RPP, a third failure impacting the new path of the gold LSP can be faced by pre-empting the resources reserved for the nominal path of the silver LSP because priority of the gold LSP is higher than priority assigned to the link 4-5 (see FIG. 7C-7D). Even if the silver LSP is no longer able to be moved back to its nominal path, the resiliency level of the network is unchanged.

Figure 3:
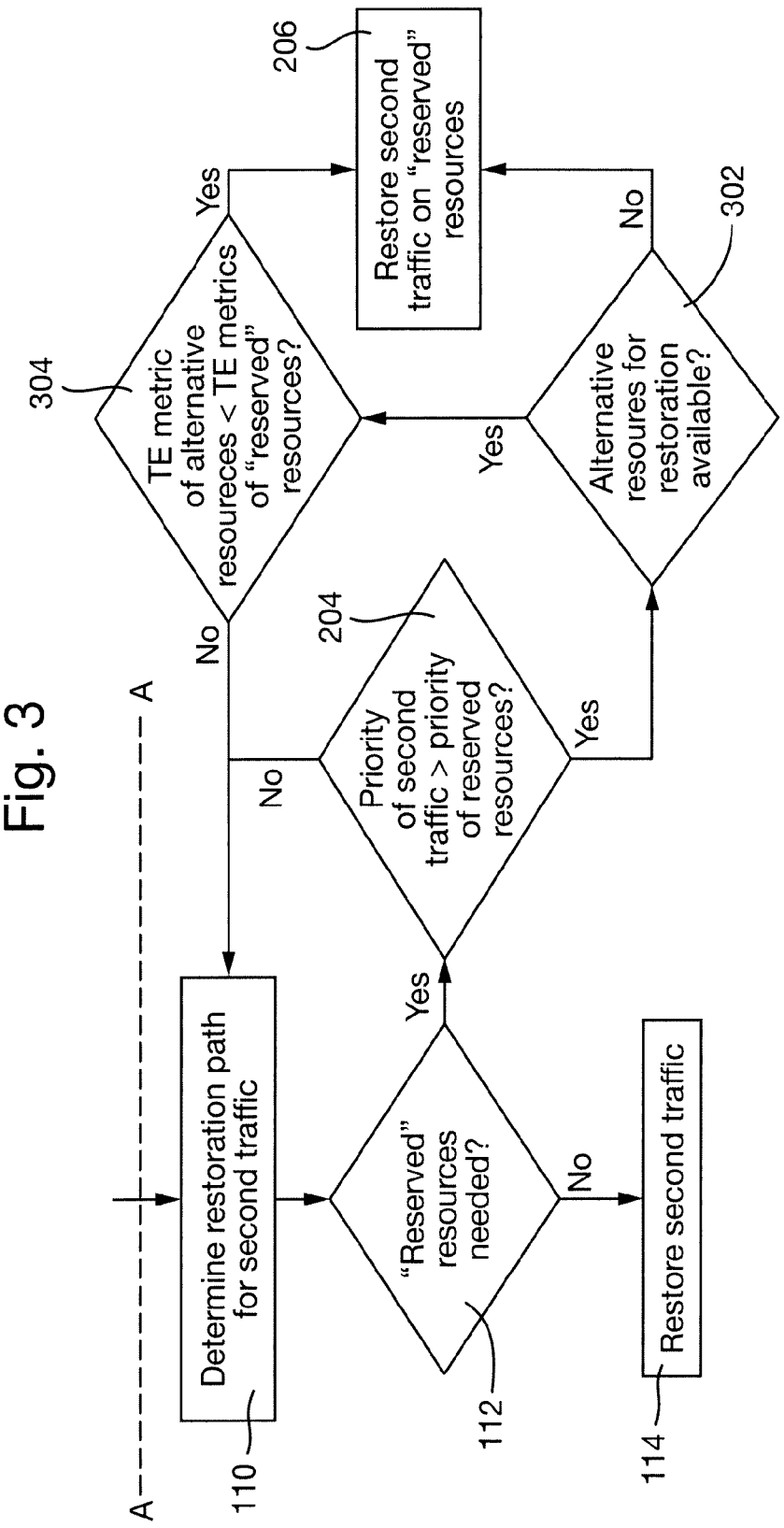
FIG. 3 is a flow-chart illustrating a method of managing allocation of network resources in traffic restoration in one embodiment of the present invention.

FIG. 3 illustrates more specific embodiment of the one illustrated in FIG. 2. Only the steps below the line A-A are illustrated and discussed here. Preferably, in the restoration of the second traffic the resources having the reserved status are used 206 if the priority of the second traffic is higher than the priority assigned to the reserved resources and if there are no other resources that could be used for restoration of the second traffic 302. The advantage of this embodiment is that it prevents from taking over resources solely on the basis of priority. This embodiment encourages searching for alternative restoration paths. In the embodiment illustrated in FIG. 7C-7D two separate traffics are affected by faults and both have to be restored on sub-optimal paths. However, if it would be always allowed to take over reserved resources then even if the first fault is repaired it will not be possible for the first traffic to return to its nominal path because it is used by the second traffic. In this embodiment the second traffic can take over reserved resources only if its priority is higher than the one assigned to the reserved resources and if there is no other way to restore the second traffic.

In a further embodiment, in the restoration of the second traffic the resources having the reserved status are used 206 if other resources that could be used for restoration of the second traffic 302 have Traffic Engineering metrics lower than Traffic Engineering metrics of the resources having the reserved status 304. In this embodiment the conditions for restoration on the reserved resources are softened. It is allowed to restore the second traffic on the reserved resources even if there is an alternative restoration path, but only if Traffic Engineering metrics of the alternative path are lower than Traffic Engineering metrics of the path using the reserved resources. In alternative embodiments other quality metrics than TE metrics may be used.

The various embodiments operate based on a rule that reserved resources are not used for restoration. The reserved resources are put aside and wait for the first fault to be repaired and for the first traffic to return. However, there are exceptions from this rule and they are discussed above and illustrated in the drawings. This is why, when the first fault is repaired 402, the first traffic returns 408 from the alternative path to the first path if resources of the first path are not used by the second traffic 406. However, if the reserved resources are used by the second traffic then the first traffic stays on the alternative path.

Figure 5:
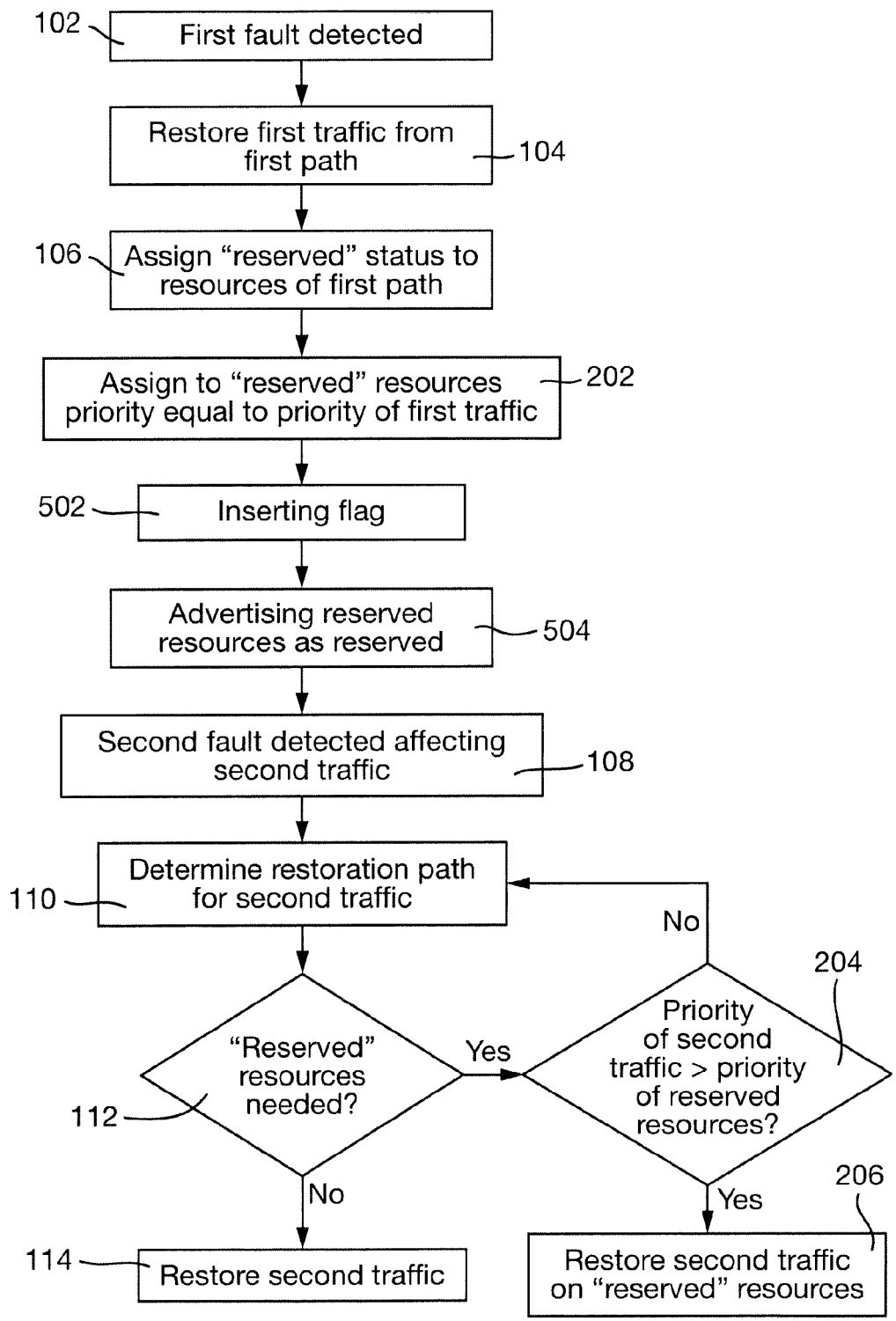
FIG. 5 is a flow-chart illustrating a method of managing allocation of network resources in traffic restoration in one embodiment of the present invention.
Figure 6:
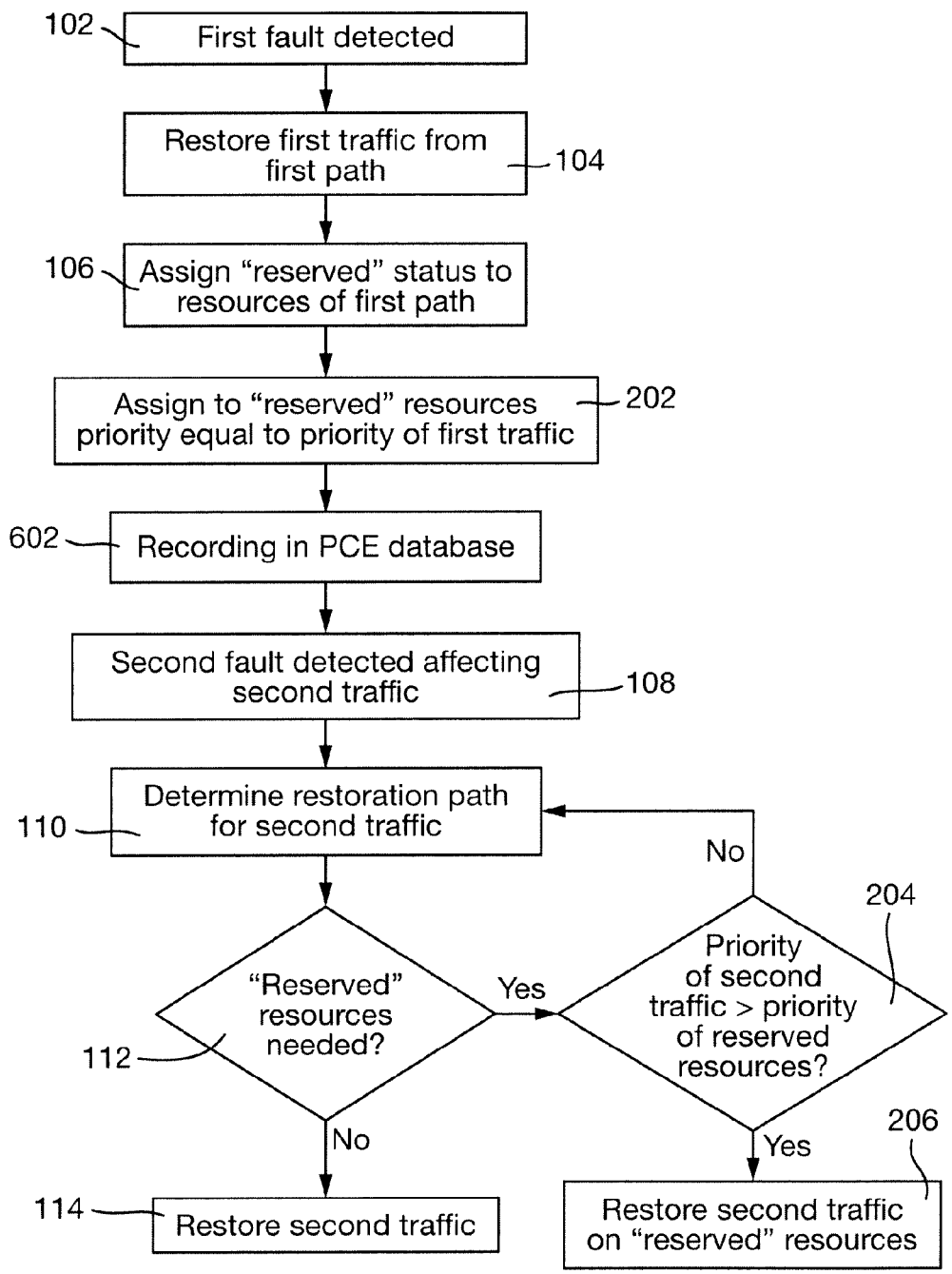
FIG. 6 is a flow-chart illustrating a method of managing allocation of network resources in traffic restoration in one embodiment of the present invention.

The method operates equally well in connection oriented networks with distributed as well as centralised control plane. There are, however, differences in practical implementations of the invention in its various embodiments depending on whether the network uses distributed (FIG. 5) or centralised control plane (FIG. 6).

In the case of distributed control plane a procedure based on RSVP-TE signaling protocol and OSPF-TE routing protocol is described below.

Figure 8:
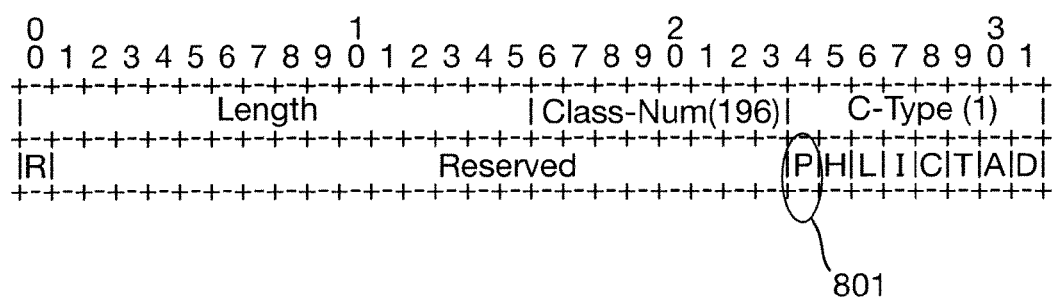
FIG. 8 is a diagram of an administrative status object of RSVP-TE signalling protocol as modified in one embodiment of the present invention.

The nominal path is setup using standard RSVP-TE signalling and it carries the first traffic until a first failure occurs that affects the nominal path. Once the first failure occurs a new path is computed for restoration of the first traffic and the restoration path is committed in the network. The resources of the nominal path are kept reserved with the assigned RPP but indicating the resources as reserved and not as committed. In one embodiment a new flag, 801, in the administrative status object of RSVP-TE is inserted as shown in FIG. 8. FIG. 8 shows a modified Admin Status Object defined in RFC3473. In the embodiment illustrated in FIG. 8 the Admin Status Object includes all the extensions defined by IRNA (Internet Assigned Numbers Authority) in addition to T, A, D parameters already defined in RFC3473.

T=Testing: 1 bit
A=Administratively down: 1 bit
D=Deletion in progress: 1 bit
C=Call Management: 1 bit from draft-ietf-ccamp-gmpls-rsvp-te-ason-04
I=Inhibit Alarm Communication: 1 bit from RFC4783
L=Lockout: 1 bit from RFC4872
H=Handover: 1 bit from RFC5852
P=Prefetch is the additional parameter (flag 801) added in embodiment of this invention. It is 1 bit stating that path is pre-fetched on the network but not activated at the moment.

Although FIG. 8 shows seven known parameters and the additional one, P, which is introduced in embodiments of the present invention in various embodiments different combinations of the parameter P with some or all of the seven parameters can be used. Moreover, additional parameters, if defined in the future, may also be used together with parameter P.

The distinction between reserved LSP and committed LSP is extremely useful in those cases like WDM where the pre-emption of committed resource is traffic affecting and hence to be avoided. Pre-emption of reserved resources when managed based on RPP is highly advantageous.

OSPF-TE routing protocol advertises the resources of the nominal path as reserved and no longer as unavailable. The resources will be not usable for the restoration of LSPs with priority lower than the indicated RPP and available for higher priorities. The advertisement in OSPF-TE is needed for the entity performing the path computation to understand whether a resource is reserved or free. The flag in RSVP-TE is used to turn some resources from free to reserved. The flag in RSVP-TE is needed because RSVP-TE as known in the art can only turn resources from free to occupied/committed, but not to reserved.

Therefore in a preferred embodiment, in a network running RSVP-TE signalling protocol and OSPF-TE routing protocol, the flag (one-bit parameter P) in RSVP-TE turns the resources to "reserved". Once the resource is "reserved" OSPF-TE advertises it and the advertisement covers both, the "reserved" status and the priority. OSPF-TE as known in the art already supports the advertisement of available bandwidth per priority (priorities from 0 to 7 where 0 is the highest), although it does not support advertisement of resources as "reserved".

If an LSP with priority higher than the RPP of the reserved resources fails to compute a restoration path with free resources, it is allowed to pre-empt the reserved resources. In this situation the LSP with lower priority cannot be re-routed back to its nominal path until the higher priority LSP does not free them up going back to its own nominal path, but resiliency of the network is maintained.

Preferably Open Shortest Path First-Traffic Engineering, OSPF-TE, routing protocol advertises 504 the resources having the reserved status as reserved resources.

If the network has a centralised control plane the method comprises recording 602 the priority and/or the reserved status of the reserved resources in a database of a Path Computation Engine. In a preferred embodiment it is a Traffic Engineering Database 1006. If we assume that the network is an SDN network then the Path Computation Engine 1004 of an SDN controller computes the nominal path for an LSP with a given RPP. As mentioned earlier, the RPP value may be inherited (or copied) from the priority of the traffic at the time of restoration. When the nominal path fails a restoration path is computed and provisioned, and the resources of its nominal path are kept reserved in the database of the PCE 1004 with their RPP recorded. If another LSP needs to be restored and no feasible path towards destination is found using free resources, the PCE 1004 performs the path computation again including also the reserved resource with priority (RPP) lower than the one of the LSP being restored.

Preferably, in a modification of all the embodiments described herein the reserved status and/or priority is assigned only to operating released resources of the first path.

Figure 9:
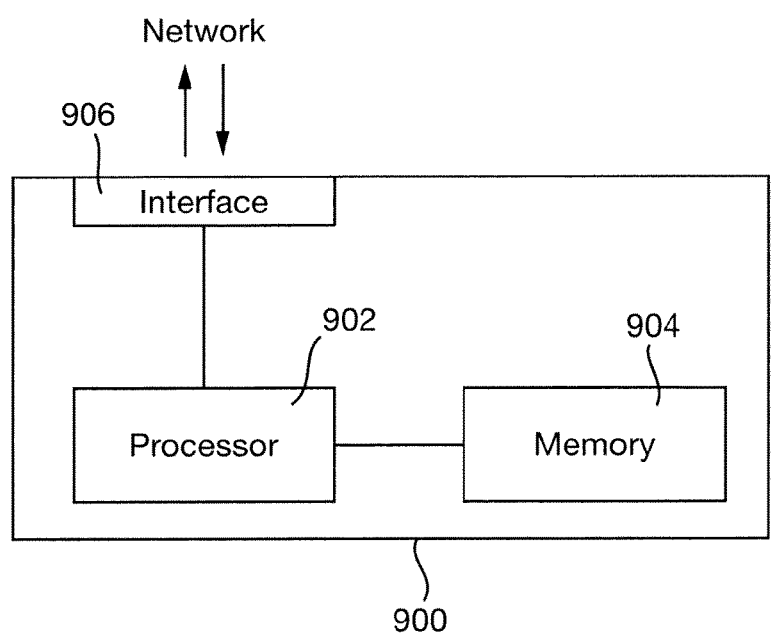
FIGS. 9-12 are diagrams illustrating nodes in various embodiments of the present invention.

FIG. 9 illustrates one embodiment of a node 900 for a connection oriented network. The node is configured to operate according to the various embodiments of the method described above. The node comprises a processor 902 and a memory 904, said memory 904 contains instructions executable by said processor 902. The node 900 is operative to restore a first traffic from a first path on an alternative path if the first path is affected by a first failure. This is shown in FIG. 7B where the first fault breaks the link between nodes 5 and 6 and the first traffic is restored on path 4-7-6. The node 900 is also operative to assign a reserved status to resources of the first path no longer used for carrying the first traffic (the status "Res" above the link 4-5). Further, the node 900 is operative to restore a second traffic from a second path if the second path is affected by a second failure. In the restoration of the second traffic the resources having the reserved status are not used. FIG. 7C shows restoration of the second traffic wherein for restoration of said second traffic resources other than the resources having the reserved status are used.

In the embodiment in which the network comprises an SDN controller, in the operation of restoration of traffic (operations 104, 114, 206 in the attached drawings) the SDN controller releases (or frees) the resources of the failed path and computes the restoration path. In various embodiments the operations may be performed one after another, or they may be performed, at least partially, simultaneously. Once the restoration path is computed it is provisioned in the network and the traffic can flow along this restoration path.

In a preferred embodiment the node 900 is further operative to assign to the resources having the reserved status a priority which is equal to priority of the first traffic. As described earlier the resources released as a result of the fault inherit priority from the traffic restored on the alternative path. Also preferably, the node is operative to use the resources having the reserved status if priority of the second traffic is higher than the priority assigned to the resources having the reserved status. This means that if the nominal path is reserved for a path with priority lower than the one that wants to "steal" the reserved resources, it is possible to pre-empt such resources (or to be more precise to pre-empt the reservation status) only for restoration of circuits with higher priority.

The node 900 is configured to operate when further conditions on pre-emptying resources having the reserved status are imposed. In one preferred embodiment if the priority of the second traffic is higher than the priority assigned to the reserved resources the node 900 is configured to use the resources having the reserved status if there are no other resources that could be used for restoration of the second traffic. In another preferred embodiment, in the restoration of the second traffic the node is operative to use resources having the reserved status if priority of the second traffic is higher than priority assigned to the reserved resources and if other resources that could be used for restoration of the second traffic have Traffic Engineering metrics lower than Traffic Engineering metrics of the resources having the reserved status. Instead of Traffic Engineering metrics other value indicative of quality of network resources may be used.

The node 900 is further operative, when the first fault is repaired, to return the first traffic from the alternative path to the first path if resources of the first path are not used by the second traffic.

As discussed earlier, the invention works both in networks with a distributed control plane and with a centralised control plane. Additionally the invention is applicable both to packet networks and optical networks. In the case of packet network operating with a distributed control plane the node 900 is a router, while in the case of optical network operating with a distributed control plane the nodes 900 is a ROADM (reconfigurable add-drop multiplexer). The node 900 for operation in a network with a distributed control plane is operative to insert a flag in an administrative status object of Resource Reservation Protocol-Traffic Engineering, RSVP-TE, and signalling protocol as shown in FIG. 8. The flag indicates the reserved status of the reserved resources. Preferably, the node 900 is also operative to advertise the priority of the reserved resources and/or to advertise the resources having the reserved status as reserved resources using OSPF-TE routing protocol.

In the case of a node for operation in a network with a centralised control plane the node 900 is a central controller and in one embodiment it may be a SDN controller, where SDN stands for Software-Defined Networking. The controller 900 for a network with a centralised control plane is operative to record the priority and/or the reserved status of the reserved resources in a database of a Path Computation Engine 1004. In one embodiment the database is a Traffic Engineering Database, TED 1006. In a preferred embodiment the TED not only keeps trace of resource but also information about LSPs.

Figure 10:
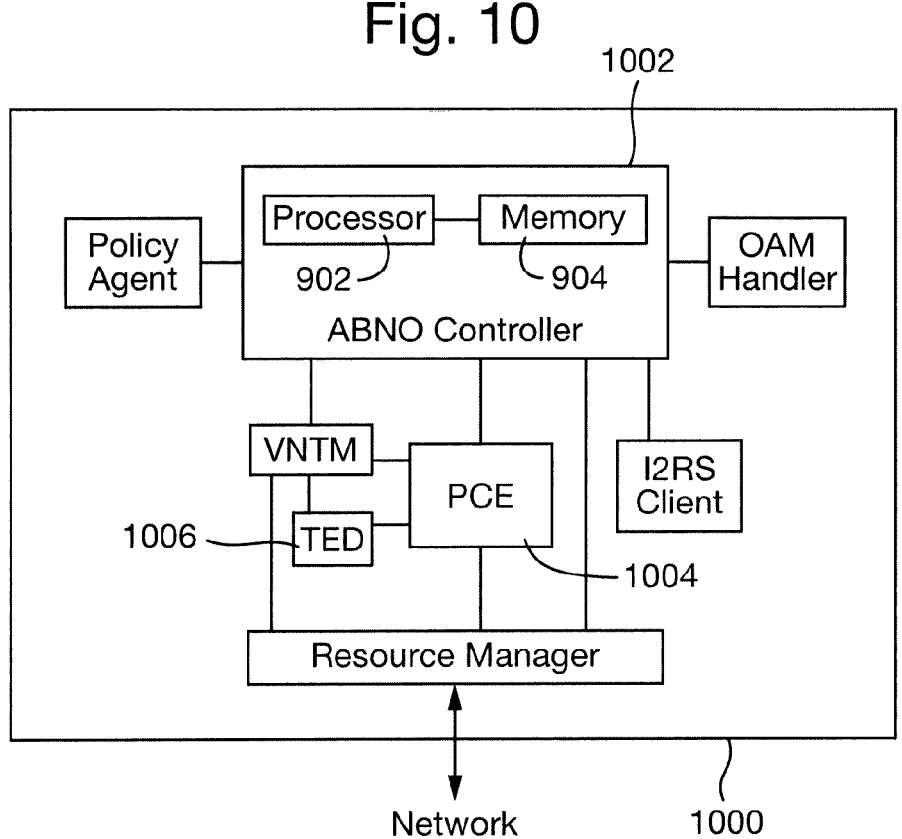

FIG. 10 illustrates one possible embodiment of an SDN controller. The SDN controller 1000 is drawn based on the IETF (Internet Engineering Task Force) ABNO (Application-Based Network Operations) architecture, but the concept is applicable to any SDN architecture. In this embodiment the processor 902 is part of the ABNO controller 1002 and the memory 904, depending on actual hardware implementation of the ABNO controller 1002 may be part of said ABNO controller 1002 or may be located outside the hardware structure of the ABNO controller 1002. In FIG. 10 only embodiment with both the processor 902 and the memory 904 being part of the ABNO controller 1002 is illustrated, but the alternative one would be easy to realise in practice based on the description above. The SDN controller 1000 also comprises a PCE 1004 and a TED 1006 discussed earlier. Remaining elements of the SDN controller are not described as they are not part of the invention and they are known in the art.

Figure 11:
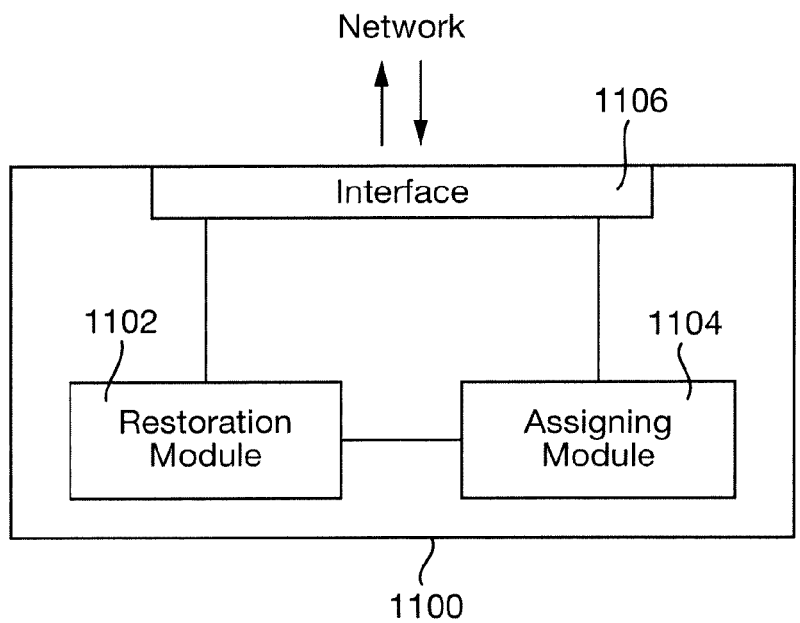

In yet another embodiment illustrated in FIG. 11 a node 1100 for a connection oriented network is illustrated. The node 1100 is configured to manage allocation of network resources in traffic restoration. In its preferred embodiment the node comprises a restoration module 1102, which is configured to restore a first traffic from a first path on an alternative path if the first path is affected by a first failure. In one embodiment the failure or fault may be a physical damage to a optical fibre or cable linking two nodes. This may happen, for example during ground works when the fibre or cable is cut and connection is lost. The fault may also affect a node in the path used by the first traffic. This may potentially be a more severe fault as nodes are often linked with other nodes via plurality of links. In this situation a node fault may result in lost connection to more than one node. The node 1100 also comprises an assigning module 1104, which is configured to assign a reserved status to resources of the first path no longer used for carrying the first traffic. The restoration module 1102 is further configured to restore a second traffic from a second path if the second path is affected by a second failure. In the restoration of the second traffic the restoration module 1102 is configured not to use the resources having the reserved status.

Figure 12:
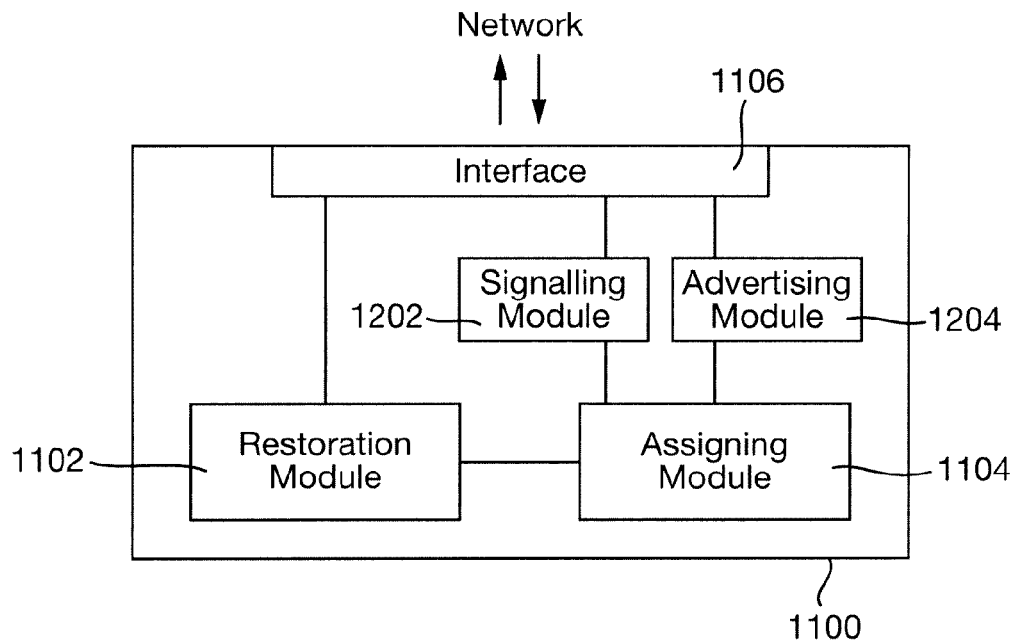
Figure 13:
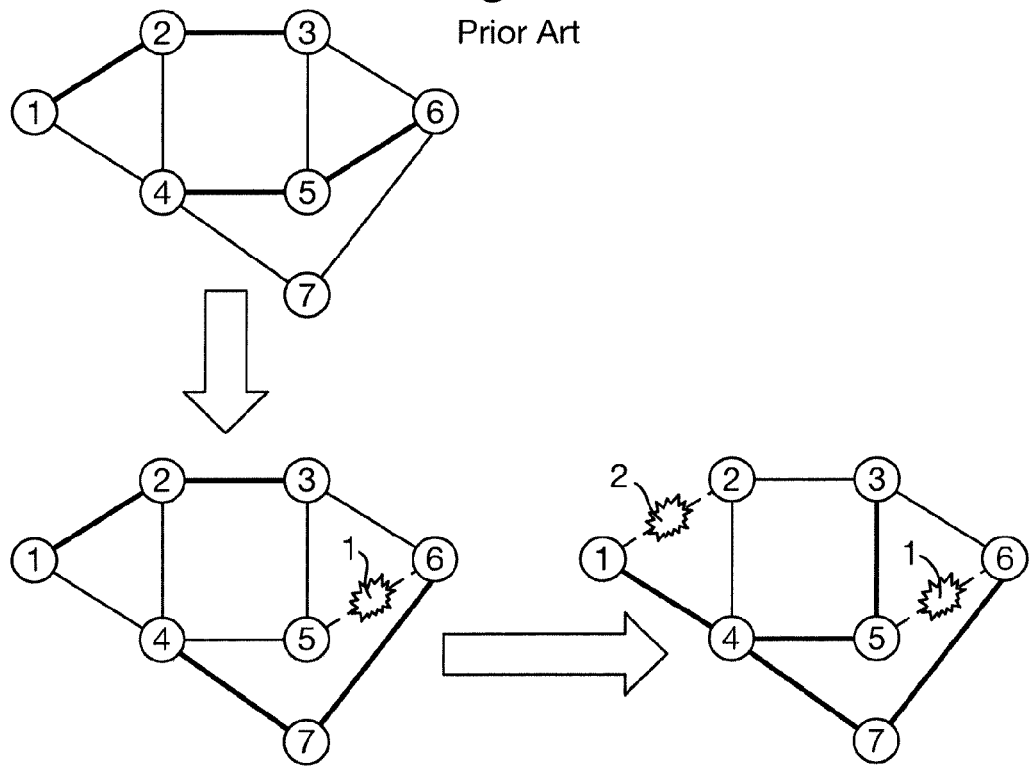
FIG. 13 shows diagrams illustrating operation of a connection oriented network known in the art.

The node in its various embodiments operates in accordance with the embodiments of the method described earlier. FIG. 12 is an illustration of a node for use in a network with a distributed control plane. In this embodiment the node 1100 comprises a signalling module 1202 which is operative to insert a flag in an administrative status object of RSVP-TE signalling protocol. The flag indicates the reserved status of the reserved resources. Further, the node 1100 may comprise an advertising module 1204, which is operative to advertise the priority of the reserved resources and/or the resources having the reserved status as reserved resources using OSPF-TE routing protocol.

In yet another, alternative embodiment, this time for a network with a centralised control plane, as shown in FIG. 11, the assigning module 1104 is operative to record the reserved status of the reserved resources in a database of a Path Computation Engine. Preferably, the assigning module 1104 also records in said database the priority of the reserved resources.

In one embodiment the database of a Path Computation Engine is a Traffic Engineering Database.

Preferably the restoration module 1102 of the node 1100 returns the first traffic from the alternative path to the first path after the first failure is repaired if resources of the first path are not used by the second traffic.

Figure 14:
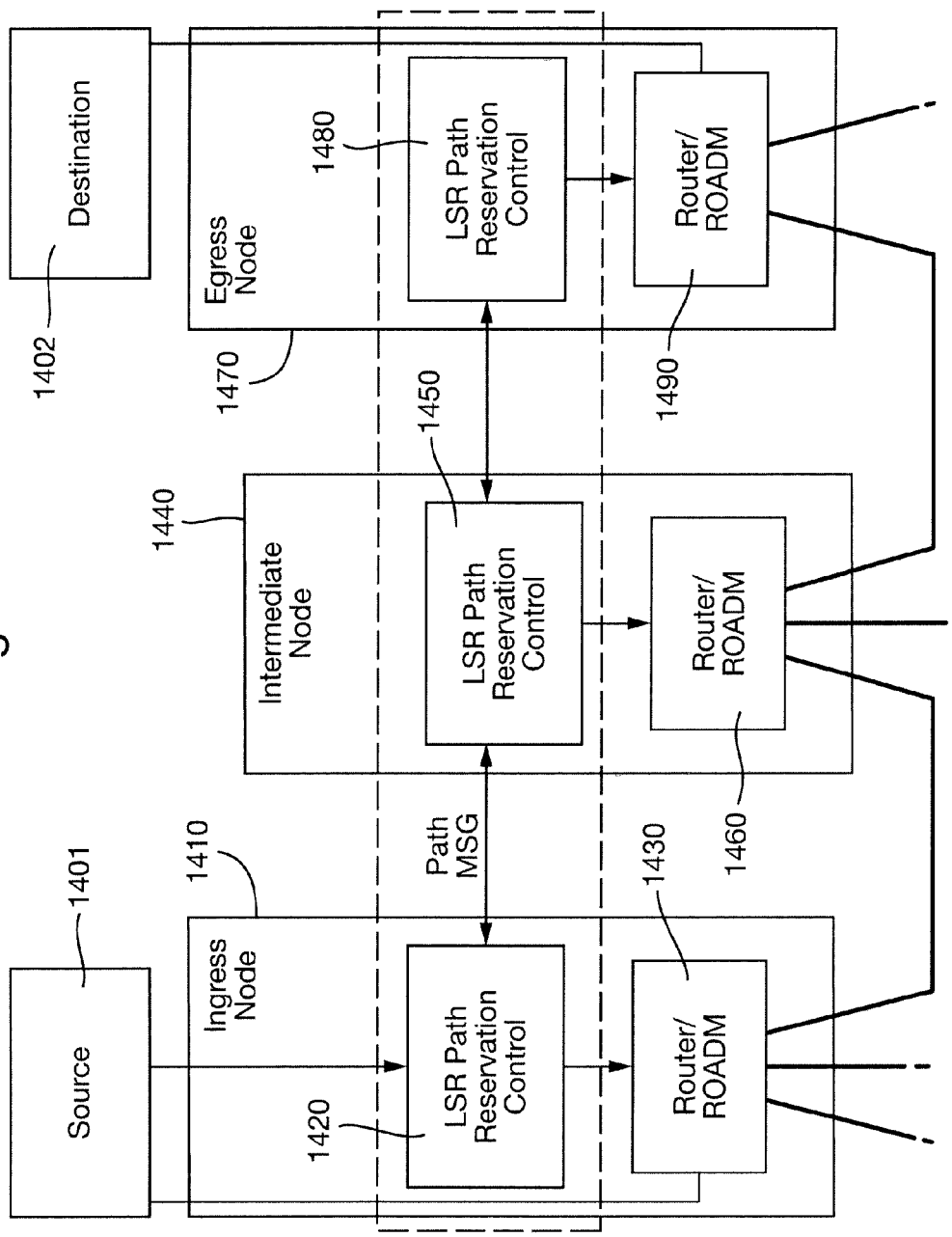

A part of a connection oriented network with a distributed control plane comprising a node as described in one of the embodiments above is illustrated in FIG. 14. Although part of the network is illustrated showing only three nodes, 1410, 1440, 1470 the description is valid for the whole network with more nodes. An ingress node 1410 has an LSR path reservation control part 1420, which controls a router or ROADM 1430, depending on the type of network as discussed earlier. Distributed control plane functions are located in the LSR path reservation control parts 1420, 1450, 1480. An intermediate node 1440 has its own LSR path reservation control part 1450, which controls a router/ROADM 1460. An egress node 1470 also has its own LSR path reservation control part 1480, which controls its router/ROADM 1490. A source 1401 is shown, as a source of the traffic through the network to a destination 1402. Links (can be optical or electrical) are shown for carrying the traffic between the nodes, and a connection is shown between the LSR path reservation control parts 1420 and 1450 of the nodes for passing messages (PATH MSG) to reserve the path. This connection can in principle use either the same or different physical links to those used by the traffic between nodes.

In an alternative embodiment, part of a connection oriented network with a centralised control plane comprising a node as described in one of the embodiments is illustrated in FIG. 15. The main difference between this embodiment and the earlier one with a distributed control plane is that the network comprises a central SDN controller 1500. Centralised control plane functions are provided by the SDN controller 1500, which is connected to LSR path reservation control parts 1520, 1550 and 1580 in the nodes 1410, 1440 and 1470. The LSR path reservation control parts control their corresponding routers or ROADMs based on instructions from the SDN controller. The SDN controller is also configured to keep track of the path reservation. There is no need for messages to reserve the path (PATH MSG) exchanged between the LSR path reservation control parts 1520, 1550 and 1580 because in the embodiment with a centralised control plane this is controlled centrally.

The invention claimed is:

1. A method of managing allocation of network resources in restoration of traffic in a connection oriented network, the method comprising:
    restoring a first traffic from a first path on an alternative path if the first path is affected by a first failure;
    assigning a reserved status to resources of the first path no longer used for carrying the first traffic, wherein the reserved status prevents the no longer used resources of the first path from being reassigned for use in another path unless at least one of a number of predefined exception conditions is satisfied.

2. The method according to claim 1 comprising assigning to the resources having the reserved status a priority which is equal to priority of the first traffic.

3. The method according to claim 2, comprising:
    restoring a second traffic from a second path if the second path is affected by a second failure,
    wherein in the restoration of the second traffic the resources having the reserved status are used if priority of the second traffic is higher than the priority assigned to the resources having the reserved status.

4. The method according to claim 3, wherein in the restoration of the second traffic the resources having the reserved status are used if there are no other resources that could be used for restoration of the second traffic.

5. The method according to claim 3, wherein in the restoration of the second traffic the resources having the reserved status are used if other resources that could be used for restoration of the second traffic have quality metrics lower than quality metrics of the resources having the reserved status.

6. The method according to claim 5, wherein Traffic Engineering metrics are used as the quality metrics.

7. The method according to claim 1, comprising returning the first traffic from the alternative path to the first path after the first failure is repaired if resources of the first path are not used by another path.

8. The method according to claim 1, wherein for network with a distributed control plane the method comprises inserting a flag in an administrative status object of Resource Reservation Protocol-Traffic Engineering, RSVP-TE, signaling protocol indicating the reserved status of the reserved resources.

9. The method according to claim 8 comprising Open Shortest Path First-Traffic Engineering routing protocol advertising a priority and/or the reserved status of the reserved resources.

10. The method according to claim 1, wherein for network with a centralised control plane the method comprises recording a priority and/or the reserved status of the reserved resources in a database of a Path Computation Engine.

11. The method according to claim 10, wherein the database is a Traffic Engineering Database.

12. The method according to claim 1, wherein the reserved status is assigned only to operating released resources of the first path.

13. A node for a connection oriented network, the node comprising a processor and a memory, said memory containing instructions executable by said processor whereby said node is operative to:
    restore a first traffic from a first path on an alternative path if the first path is affected by a first failure;
    assign a reserved status to resources of the first path no longer used for carrying the first traffic, wherein the reserved status prevents the no longer used resources of the first path from being reassigned for use in another path unless at least one of a number of predefined exception conditions is satisfied.

14. The node according to claim 13 further operative to assign to the resources having the reserved status a priority which is equal to priority of the first traffic.

15. The node according to claim 14, wherein said node is further operative to:
    restore a second traffic from a second path if the second path is affected by a second failure,
    wherein in the restoration of the second traffic the node is operative to use the resources having the reserved status if priority of the second traffic is higher than the priority assigned to the resources having the reserved status.

16. The node according to claim 15, wherein in the restoration of the second traffic the node is operative to use resources having the reserved status if there are no other resources that could be used for restoration of the second traffic.

17. The node according to claim 15, wherein in the restoration of the second traffic the node is operative to use resources having the reserved status if other resources that could be used for restoration of the second traffic have quality metrics lower than quality metrics of the resources having the reserved status.

18. The node according to claim 17, wherein Traffic Engineering metrics are used as the quality metrics.

19. The node according to claim 13, further operative to return the first traffic from the alternative path to the first path after the first failure is repaired if resources of the first path are not used by another path.

20. A connection oriented network comprising a node as claimed in claim 13, said node connected to at least one other node.

* * * * *